US010816803B2

(12) United States Patent
Reed et al.

(10) Patent No.: US 10,816,803 B2
(45) Date of Patent: Oct. 27, 2020

(54) REFLECTIVE LENS HEADSET

(71) Applicant: Mira Labs, Inc., Los Angeles, CA (US)

(72) Inventors: Montana Reed, Los Angeles, CA (US); Joseph May, Los Angeles, CA (US); Norio Fujikawa, San Francisco, CA (US); Oliver Henderson, San Francisco, CA (US); Sean Missal, San Francisco, CA (US); Richard Migliaccio, Mount Sinai, NY (US)

(73) Assignee: Mira Labs, Inc., Los Angeles, CA (US)

( * ) Notice: Subject to any disclaimer, the term of this patent is extended or adjusted under 35 U.S.C. 154(b) by 0 days.

(21) Appl. No.: 15/944,711

(22) Filed: Apr. 3, 2018

(65) Prior Publication Data
US 2018/0284454 A1 Oct. 4, 2018

Related U.S. Application Data

(60) Provisional application No. 62/480,992, filed on Apr. 3, 2017, provisional application No. 62/533,606, filed
(Continued)

(51) Int. Cl.
*G02B 27/14* (2006.01)
*G02B 27/01* (2006.01)
(Continued)

(52) U.S. Cl.
CPC ..... *G02B 27/0172* (2013.01); *G02B 27/0176* (2013.01); *G06K 9/00671* (2013.01);
(Continued)

(58) Field of Classification Search
CPC ............ G02B 27/0093; G02B 27/0101; G02B 27/0149; G02B 27/0172; G02B 27/0176;
(Continued)

(56) References Cited

U.S. PATENT DOCUMENTS

2010/0215069 A1\* 8/2010 Otsuka ...................... H01S 3/16
372/41
2012/0326948 A1\* 12/2012 Crocco .................... G09G 5/00
345/7

(Continued)

*Primary Examiner* — Mustak Choudhury
(74) *Attorney, Agent, or Firm* — Buchalter, a professional corp.; Kari L. Barnes

(57) ABSTRACT

A headset system is described herein including a number of features including a frame and optical element. The headset system may include different combinations of an attachment mechanism to attach the frame and optical element; an alignment mechanism to align the optical element in a predetermined relative location to the frame; a retention mechanism to retain an inserted mobile device into the frame in a predetermined, relative location to the frame; a head restraint system including one or more straps; and combinations thereof. The retention mechanism may include an elastic cover over the frame. The straps may include reinforcement features, mated connection features, and combinations thereof. The reinforcement feature may include a concave, ovoid, indentation on an inner surface of the strap.

19 Claims, 11 Drawing Sheets

Related U.S. Application Data on Jul. 17, 2017, provisional application No. 62/553,692, filed on Sep. 1, 2017, provisional application No. 62/560,032, filed on Sep. 18, 2017, provisional application No. 62/591,760, filed on Nov. 28, 2017.

(51) Int. Cl.
*G06K 9/00* (2006.01)
*G02B 27/09* (2006.01)

(52) U.S. Cl.
CPC ...... *G02B 27/0955* (2013.01); *G02B 27/0977* (2013.01); *G02B 2027/0194* (2013.01)

(58) Field of Classification Search
CPC ............ G02B 27/0955; G02B 27/0977; G02B 27/017; G02B 27/102; G02B 27/144; G02B 27/2228; G02B 17/08; G02B 17/0832; G02B 17/0892; G02C 5/008; G02C 5/146; G02C 5/14; G02C 5/22; G06K 9/00671; G06T 19/006; B29D 11/00028
USPC ............ 359/602, 630–638, 726; 361/679.03; 348/47, 222.1, 376
See application file for complete search history.

(56) References Cited

U.S. PATENT DOCUMENTS

| | | | |
|---|---|---|---|
| 2015/0260993 A1* | 9/2015 | Bickerstaff | G02B 27/0172 345/8 |
| 2016/0195723 A1* | 7/2016 | Murray | G02B 27/0172 359/631 |
| 2017/0195563 A1* | 7/2017 | Ribeiro | H04N 5/23238 |

* cited by examiner

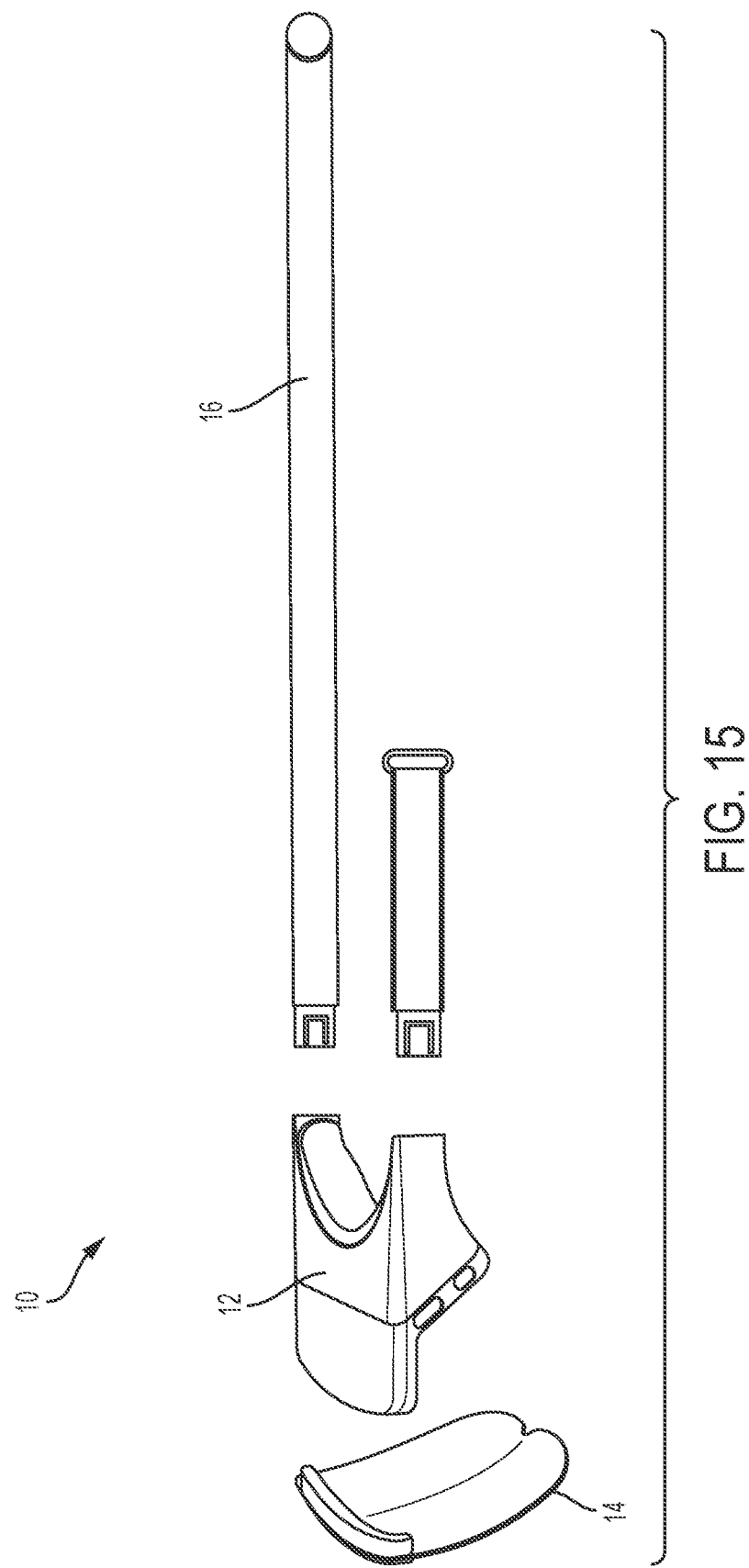

REFLECTIVE LENS HEADSET

PRIORITY

This application claims priority to U.S. Application No. 62/480,992, filed Apr. 3, 2017; U.S. Application No. 62/533,606, filed Jul. 17, 2017; U.S. Application No. 62/553,692, filed Sep. 1, 2017; U.S. Application No. 62/560,032, filed Sep. 18, 2017; and U.S. Application No. 62/591,760, filed Nov. 28, 2017, each of which is incorporated by reference in its entirety into this application.

BACKGROUND

Head Mounted Displays (HMDs) produce images intended to be viewed by a single person in a fixed position related to the display. HMDs may be used for Virtual Reality (VR) or Augmented Reality (AR) experiences. The HMD of a virtual reality experience immerses the user's entire field of vision and provides no image of the outside world. The HMD of an augmented reality experience renders virtual, or pre-recorded images superimposed on top of the outside world.

Augmented reality headsets may be classified into two categories: video pass-through and optical see-through. With video pass-through augmented reality headsets, users are looking at a screen that is displaying a continuous live feed of the world captured by one or more cameras on the front of the headset. Virtual imagery is superimposed on the video feed. With optical see-through augmented reality headsets, users are looking through a transparent lens or other optical component directly at the real world. An optical system takes an image produced outside a user's field of view and displays the image as a virtual overlay so that it appears on top of or integrated into the physically perceived world.

Video pass-through augmented reality headsets are more common because they are easier to design and are traditionally significantly less expensive. However, optical see-through augmented reality headsets are lighter weight, more comfortable on the eyes, can be used in more situations, are significantly less nauseating, allow for eye contact in social situations, and provide a more compelling experience.

There are few commercially available optical see-through augmented reality headsets. Most existing headsets are expensive, heavy, and bulky. Some headsets have a small field of view, meaning that superimposed imagery is only displayed in a small section of a user's vision. Existing systems either contain an entire computer integrated into the headset or must be connected to a powerful external computer to operate. Existing augmented reality headsets either have integrated cameras for positional tracking or an external tracking system. Integrated cameras are expensive and add bulk to headsets and external tracking systems limit where headsets can be used.

SUMMARY

Exemplary embodiments described herein include a headset system having a frame configured to support a mobile device of a user, and an optical element coupled to the frame configured to reflect an image displayed by the mobile device to the user. Exemplary embodiments may therefore be used to superimpose virtual objects displayed on the mobile device into the field of view of the user. In an exemplary embodiment, the optical element may be configured to be partially reflective and partially transparent so that the user may view the virtual objects overlayed on a physical environment viewed by the user through the optical element.

Exemplary embodiments described herein include a number of unique features and components. No one feature or component is considered essential to the invention and may be used in any combination or incorporated on any other device or system. For example, exemplary embodiments described herein are generally in terms of an augmented reality system, but features and components described herein may be equally applicable to virtual reality systems or other head mounted systems. Accordingly, headset system is intended to encompass any head mounted system including, but not limited to, augmented reality and virtual reality systems.

In an exemplary embodiment, the headset system includes an attachment mechanism between the frame and the optical element for removably and/or pivotably attaching the optical element to the frame. For example, the attachment mechanism may include a first plurality of magnets in a first attachment mechanism of the frame and a second plurality of magnets in a second attachment mechanism of the optical element wherein adjacent ones of the first plurality of magnets alternate orientations such that the first plurality of magnets alternate polarity in a forward facing direction. The second plurality of magnets may then be positioned and oriented such that each of the second plurality of magnets aligns and mates with one of the first plurality of magnets, and the second plurality of magnets have an opposing polarity directed toward a corresponding one of the first plurality of magnets.

In an exemplary embodiment, the headset may also include a retention mechanism. For example, the retention mechanism may be an elastic cover on top of the frame. The elastic cover may be configured to push or apply an external force to an inserted mobile device to position the mobile device against desired surfaces or edges of the frame. For example, the compartment of the frame may include a back surface, a first lateral side surface extending outward from the back surface, a second lateral side surface extending outward from the back surface on an opposite end of the back surface from the first lateral side, and a bottom side extending from the back surface, and the bottom side may include a flanged edge. The elastic cover may be configured to position the inserted mobile device away from the back surface and toward the bottom side and the flanged edge. The back surface may also include an indentation along a same edge as the bottom side.

In an exemplary embodiment, the optical element may include a first section and a second section, where the first and second sections are shaped and sized as mirror reflections of each other. The first section and second sections may define curved surfaces having a first radius of curvature in a first cross section and a second radius of curvature is a second cross section perpendicular to the first cross section. A first concave surface of the first section and a second concave surface of the second section may include a reflective coating. The optical element may also include an anti-reflective coating, a hydrophobic coating, and an abrasion resistant coating.

DRAWINGS

FIG. 15 illustrates an exemplary head set system in component parts.

DESCRIPTION

Figure 1:
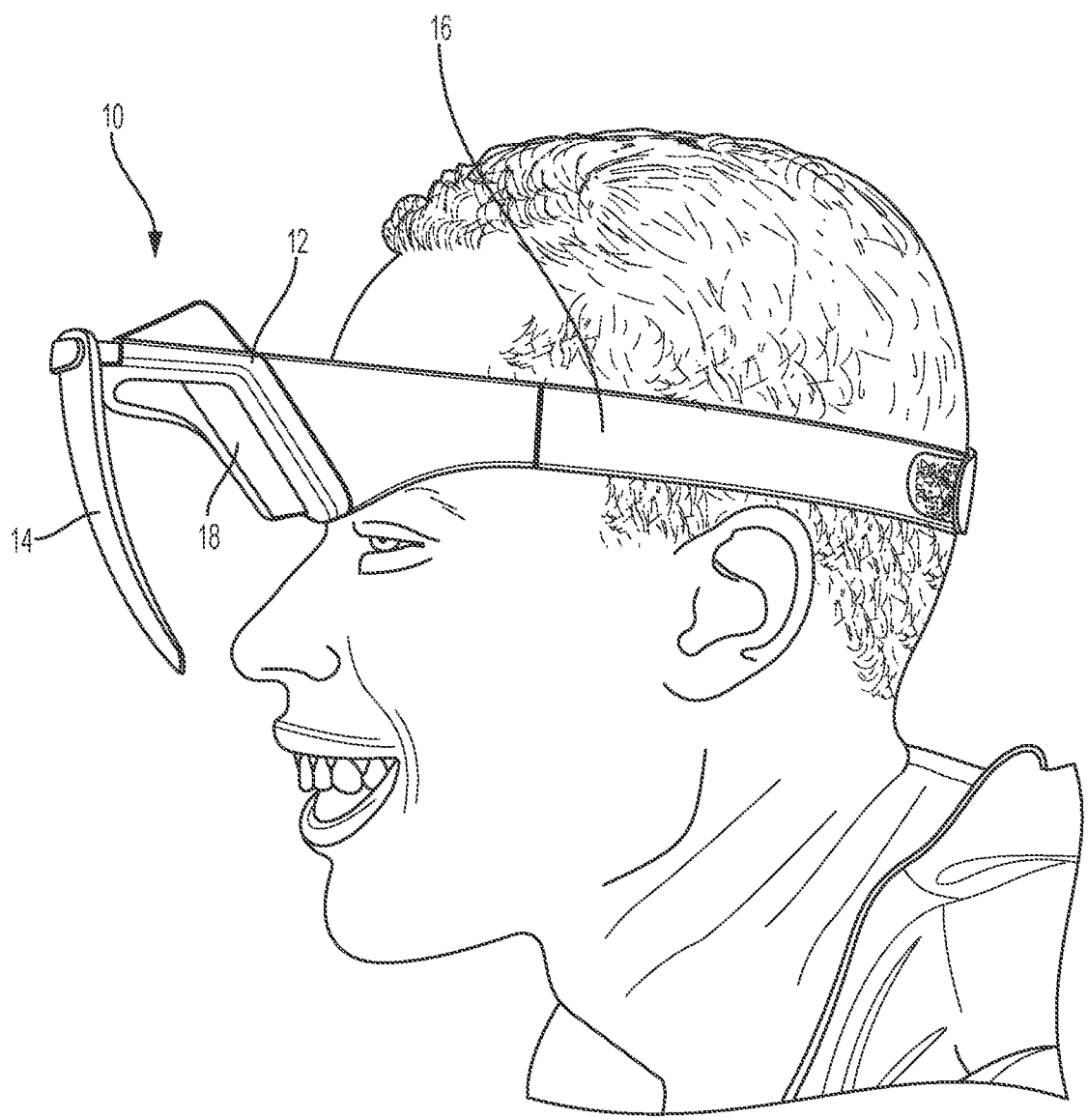
FIG. 1 illustrates an exemplary side profile view of an exemplary headset system 10 according to embodiments described herein positioned on a user's head.

The following detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. It should be understood that the drawings are diagrammatic and schematic representations of exemplary embodiments of the invention, and are not limiting of the present invention nor are they necessarily drawn to scale.

Exemplary embodiments described herein include a headset system, having a frame with a compartment configured to support a mobile device, and an optical element coupled to the frame configured to reflect an image displayed on the mobile device. The headset may include an attachment mechanism between the frame and the optical element for removable and/or pivotable attachment of the optical element to the frame. The headset may include alignment mechanism to position the optical element relative to the frame when engaged. The headset may include a retention feature to position the inserted mobile device in a predefined, relative location to the frame. In an exemplary embodiment, the retention features is an elastic cover. The headset may include a head restrain system.

In an exemplary embodiment, the attachment mechanism may include a first plurality of magnets in a first attachment mechanism of the frame and a second plurality of magnets in a second attachment mechanism of the optical element wherein adjacent ones of the first plurality of magnets alternate orientations such that the first plurality of magnets alternate polarity in a forward facing direction. The second plurality of magnets may be positioned and oriented such that each of the second plurality of magnets aligns and mates with one of the first plurality of magnets, and the second plurality of magnets have an opposing polarity directed toward a corresponding one of the first plurality of magnets.

In an exemplary embodiment, the alignment mechanism may be mated surfaces, such that a first surface on the frame is the mated match to a second surface on the optical element. The mated surfaces may, for example, include an indent and detent.

In an exemplary embodiment, the head restrain system may include a pair of straps extending from the frame. At least one of the pair of straps may have a taper such that a first end of the at least one of the pair of straps is thinner than a second end of at least one of the pair of straps. Each of the pair of straps may include an indentation on an inner surface of each of the pair of straps, the indentation defining an ovoid shape. The optical element may include a first section and a second section, the first section and second section may be mirrored opposites such that they are shaped and oriented to appear as reflections of the other about an axis of reflection. The axis of reflection defining the mirrored opposites may be about an axis extending between the first section and second section.

In an exemplary embodiment, the first section and second section may define curved surfaces having a first radius of curvature in a first cross section and a second radius of curvature is a second cross section perpendicular to the first cross section. A first concave surface of the first section and a second concave surface of the second section may include a reflective coating. The optical element may also include an anti-reflective coating, a hydrophobic coating, and an abrasion resistant coating, and combinations thereof.

In an exemplary embodiment, the frame is configured to position a screen of the mobile device at an angle, away from the frame and toward the optical element, the frame configured to not obstruct light coming into a forward facing camera of the mobile device and providing access to other ports and control features of the mobile device.

Although embodiments of the invention may be described and illustrated herein in terms of augmented reality systems, it should be understood that embodiments of this invention are not so limited, but are additionally applicable to virtual reality systems. Features of the system may also be applicable to any head mounted system. Exemplary embodiments may also include any combination of features as described herein. Therefore, any combination of described features, components, or elements may be used and still fall within the scope of the instant description.

FIG. 1 illustrates an exemplary side profile view of an exemplary headset system 10 according to embodiments described herein positioned on a user's head. The headset system 10 includes a frame 12, optical element 14, and mounting system 16. The headset system 10 is configured to position an inserted mobile device 18 relative to the optical element 14 and the user.

Exemplary embodiments of the headset 10 may include a frame 12 to secure the positioning of an inserted mobile device 18, an optical element 14 to reflect and combine the virtual imagery produced by a screen of the mobile device 18 with an un-modified or minimally modified view of the physical world, and a mounting system 16 that affixes and secures the frame 12, supporting the inserted mobile device 18 and attached optical element 14 to a user during operation.

Exemplary embodiments may include a "free-space" optical assembly that can reduce the cost, weight, and complexity of an augmented reality headset by reducing the number of optical components to a single optical component between a display for rendering the virtual object and the user's eye for superimposing the virtual object into the physical field of view of the user. Free-space optical assemblies also exhibit a significantly larger field of view than most other approaches.

Figure 2:
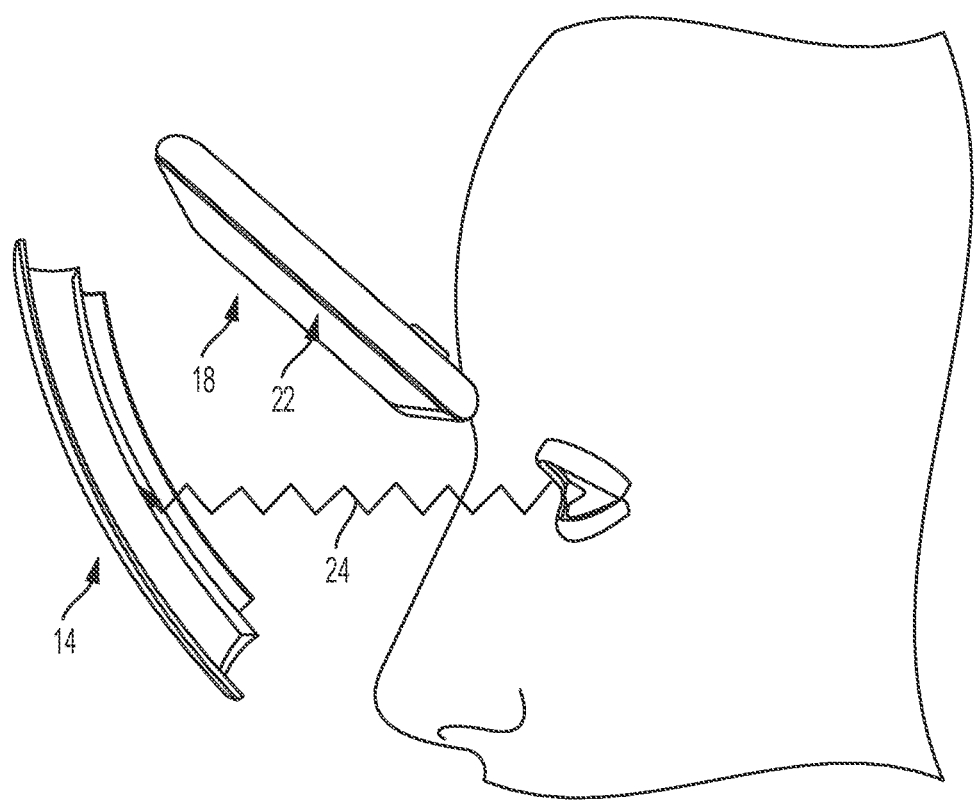
FIG. 2 illustrates an exemplary system of FIG. 1 in which elements of the headset have been removed to show relative component orientation.

FIG. 2 illustrates an exemplary illustration of FIG. 1 in which elements of the headset have been removed. FIG. 2 illustrates the relative position of an inserted mobile device relative to the user when positioned within the headset during use. In an exemplary embodiment, the headset 10 includes a frame 12 to secure a display 18 to the headset 10. Any attachment or support may be use where the mobile device is positioned with the screen directed toward the optical element 14 and away from the user's eyes. The frame 12 and headset 10 may be configured such that the mobile device 18 is positioned outside of the physical field of view of the user, thus defining a free space 24 between the user's eye and the optical element 14. Exemplary embodiments of the system are configured such that the relative position of the optical element and a screen of the mobile device are predefined and static when the mobile device is fully seated or attached to the frame.

As best seen in FIG. 2, the headset 10 is configured to position a mobile device 18 relative to the optical element 14 and the user's head and/or user's eye. The mobile device 18 has a display screen 22 that can produce an image. The image may correspond to virtual objects to be overlayed within a user's field of view. The mobile device 18 is positioned within the headset 10 with the display screen 22 facing toward the optical element 14. The optical element is configured to reflect a portion of the displayed image. The orientation of the mobile device, optical element, and headset is such that the displayed image is reflected by the optical element toward a user's eye so the user perceives the virtual object within their field of view.

In an exemplary embodiment, the mobile device 22 is positioned out of a normal field of view of the user. The normal field of view of the user may be the area a user sees when looking straight forward in front of their face. In an exemplary embodiment, the mobile device 22 may be positioned at a peripheral edge of the normal field of view, such that the phone may be seen in the peripheral vision. The configuration therefore may have only a single optical element for reflecting the displayed image along the light path of the display and the user's eye.

Figure 3:
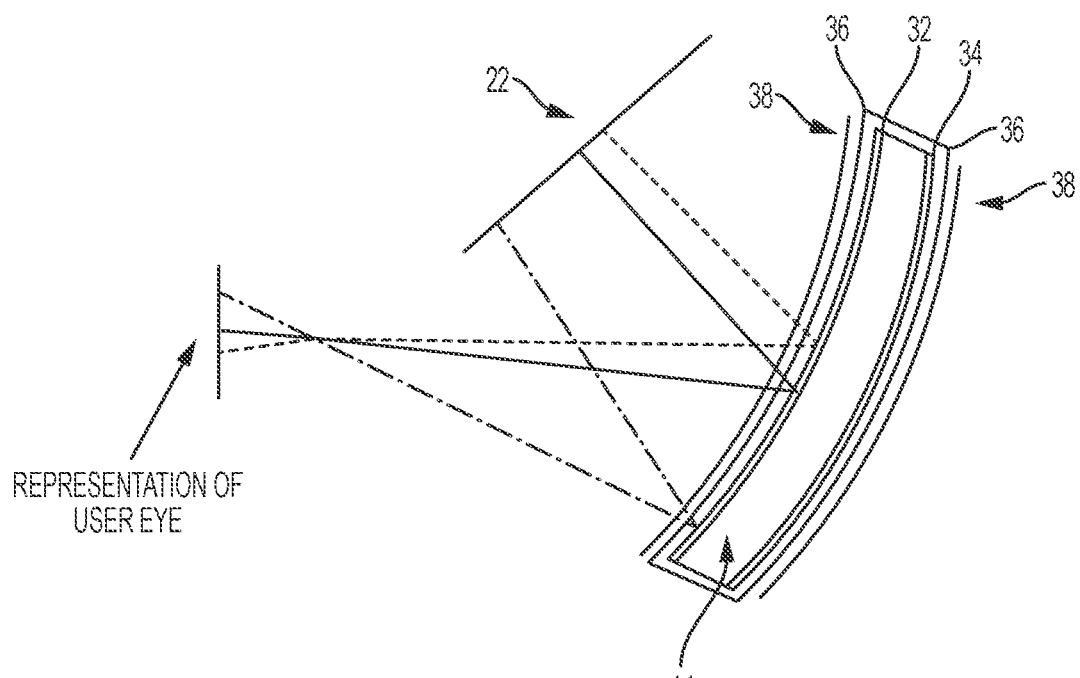
FIG. 3 illustrates an exemplary light propagation from a display screen to the user's eye using an optical element according to embodiments described herein.
Figure 4:
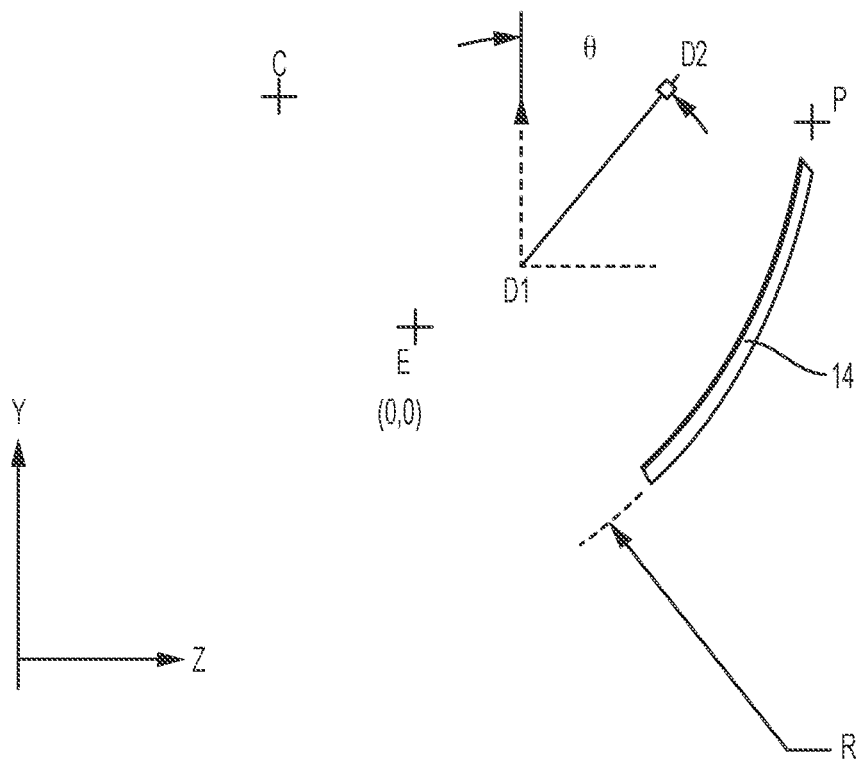
FIG. 4 illustrates an exemplary representation of the elements of FIG. 2 relative to a coordinate system centered about the user's eye.

FIG. 3 illustrates an exemplary light propagation from a display screen to the user's eye using the optical element 14. FIG. 4 illustrates an exemplary representation of the elements of FIG. 2 relative to a coordinate system centered about the user's eye.

The curvature of the optical element and the positioning of the optical element in relation to the image display/projector may determine many of the visual characteristics of the combined image seen by a headset wearer including, but not limited to clarity, aberrations, field of view, and focal distance. The curvature of the optical element and its positioning may be designed in concert to optimize visual characteristics. In various embodiments, the curvature of the optical element may be spherical, elliptical, toroidal, or free-form in nature.

An exemplary optical element functions to reflect the images from a display or projector such that the images appear to be "combined" with the view of the physical world of the user as seen through the optical element. To achieve this function, the optical element may have certain transparent/translucent and/or reflective properties. The optical element may not be refractive in order to present an undistorted view of the world to a wearer. The optical element may be transparent or partially transparent. In some embodiments, the optical element may have a tint or coloration. The optical element may be partially reflective, thus creating a beam splitting or beam combining effect, on its surface facing an inserted phone screen and a wearer's eyes.

In an exemplary embodiment, the optical element 14 defines a spherical curvature. The optical element therefore has a first single radius of curvature as the optical element is traversed in a first direction and a second single radius of curvature as the optical element is traversed in a second direction. The first and second directions may be orthogonal. In an exemplary embodiment, the first direction is in a vertical direction from top to bottom, and the second direction is a lateral direction from side to side. The first radius of curvature may be the same or different from a second radius of curvature. In an exemplary embodiment, the horizontal radius of curvature is greater than the vertical radius of curvature. In an exemplary embodiment, the optical element 14 has only the first single radius of curvature and is not curved in a second direction. The optical element may be generally linear in a second cross section perpendicular to the first cross section. In an exemplary embodiment, the center of the radius of curvature is above and behind an assumed or expected location of the user's eye. Above refers to a direction vertically upward when the headset is in an in use position and behind is in a direction on the opposite side of the user's eye than the optical element or in a direction toward the back of the user's head. In an exemplary embodiment, the optical element 14 has a uniform thickness. In an exemplary embodiment, the average thickness of the optical element is approximately 1.0-2.0 mm.

For example, FIG. 4 illustrates an exemplary side, cross-sectional view of an optical element. As illustrated, the optical element may define a first radius of curvature such that the optical element has a concavity or inward curve as the element is traversed from a top to the bottom thereof. In other words, the perpendicular cross section of the optical element may define a curve. The curvature may consist of only a single radius of curvature. The optical element may include two portions (either integrated or separate), each with a single and the same radius of curvature. As shown, the optical element defines a curvature in a first plane (illustrated in FIG. 4 where the plane of curvature is perpendicular to the optical element and parallel to the page). Therefore, when seen in cross section, the optical element defines a radius of curvature. In an exemplary embodiment, the radius of curvature is approximately 100 millimeters (mm) to 150 mm and more approximately 125 mm to 135 mm. In an exemplary embodiment, a first radius of curvature is approximately 125-130 mm and a second radius of curvature is approximately 125-135 mm. In an exemplary embodiment, the center of the radius of curvature is approximately 50-60 mm above the user's eye and 25-40 mm behind the user's eye. FIG. 4 represents the optical elements center of curvature as "C" and the user's eye as "E". Approximations are within the margin of error of those of skill in the art. For this application, the approximation is based on the margin of error for creating the optical element parts as well as the visual effect the error has on the reflected image to the user. For example, the radius approximation may be within +/−0.2 inches (0.5 cm).

In an exemplary embodiment, the optical element may include one or more coatings on one or both surfaces. Coatings may be used to improve or reduce reflective properties, scratch resistance, smudge resistance, strength, shatter resistance, and combinations thereof.

A first coating 32 may be a reflective coating to create a partial reflection. The first coating may be on a concave side of the optical element. In an exemplary embodiment, the reflective coating is configured to reflect approximately 25-45% of incident light. The reflective coating may be a dielectric or metallic material.

A second coating 34 may be an anti-reflective coating to reduce any reflected incident light. The second coating may be on a convex side of the optical element.

A third coating 36 may be on one or both sides of the optical element. The third coating may be a hard coating or protection layer. The third coating may be configured to be abrasion resistant, improve strength, reduce shatter, reduce scratching, bond one or more of the other layers and the optical element, and combinations thereof. The third coating may be one or more coatings of one or more materials to achieve a desired combination of functions.

A fourth coating 38 may be on one or both sides of the optical element. The fourth coating may be a hydrophobic layer. The fourth coating may be on an exterior of final, outer surface of the optical element.

Although specific configurations of the optical element are provided herein, other configurations are also contemplated herein. In addition, any optical element may be used in place of the instant optical element and remain within the scope of the instant invention. For example, free form optical elements may also be used, any combinations and locations of coatings and surface treatments may be used, and any arrangement of optical elements may be used.

Figure 5A:
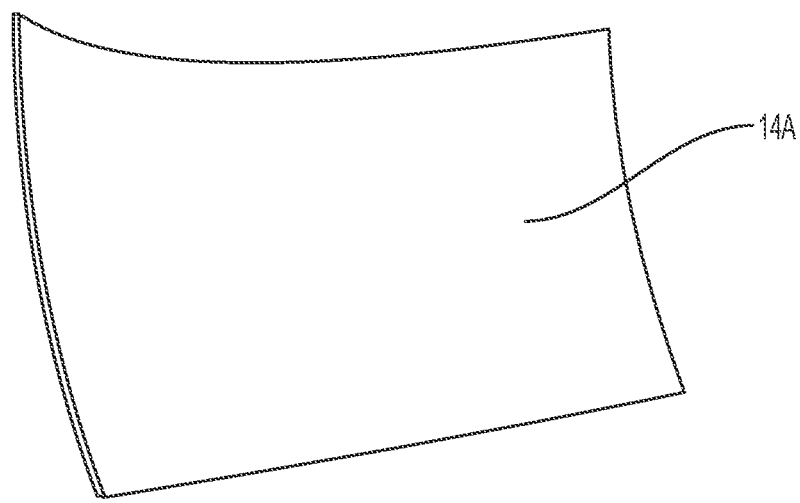
FIGS. 5A-5C illustrate exemplary optical elements according to embodiments described herein.
Figure 5B:
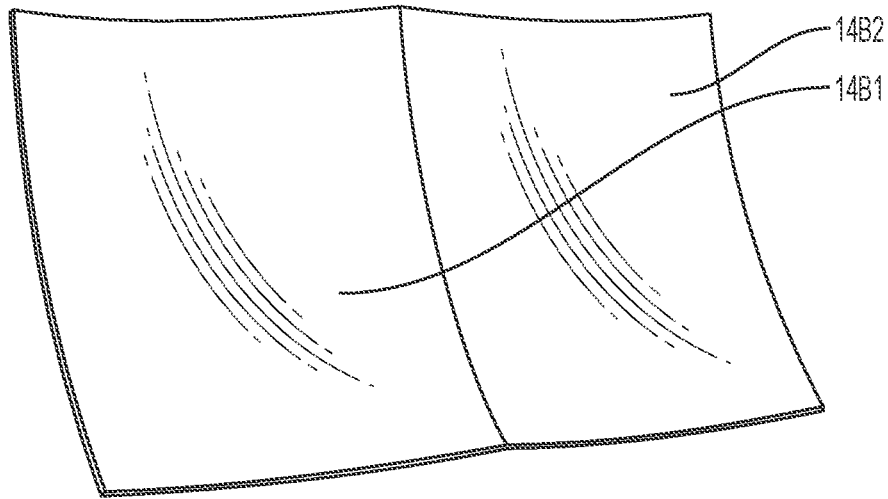
Figure 5C:
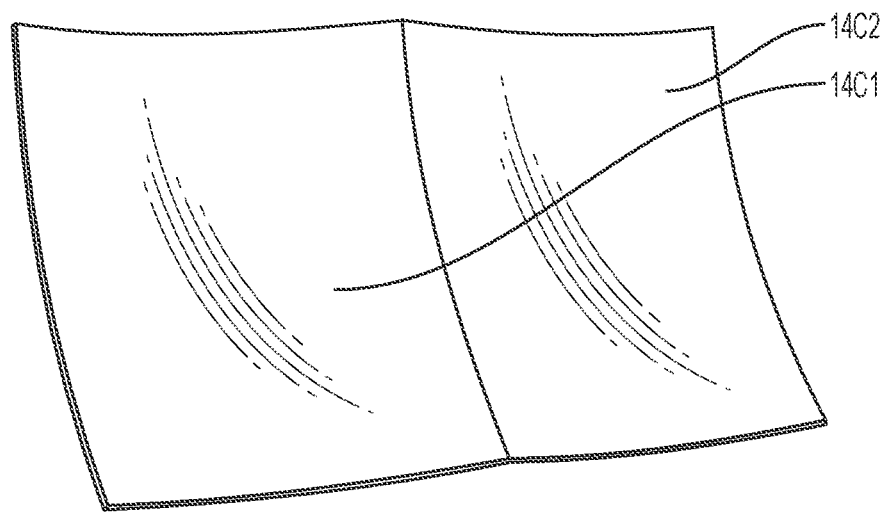

FIGS. 5A-5C illustrate exemplary optical elements according to embodiments described herein. In an exemplary embodiment, the optical element is a single component 14A that reflects a monoscopic image to a wearer. For example, as seen in FIG. 5A, a single monolithic integrated optical element extends across the vision area to display an image for both eyes. The system may also be configured such that the single component 14A may be used to reflect a stereoscopic image such that a separate image is provided for viewing by each eye, individually. The optical element may have a consistent and continuous shape across the optical element.

In an exemplary embodiment, the optical element 14B1, 14B2, 14C1, 14C2 includes two identical subcomponents that produce a stereoscopic image by reflecting different images to a wearer's left and right eyes. Therefore, the display or projector for generating the virtual element creates a first and second region where each region produces the image for display for a respective eye. For example, as seen in FIGS. 5A and 5B, the optical element 14B1, 14B2 and 14C1, 14C2 includes two adjacent components 14B1, 14B2 or 14C1, 14C2 that produce a stereoscopic image by reflecting separate images to a wearer's left and right eyes. In an exemplary embodiment, the optical element may include two semi-identical adjacent components where the adjacent components are mirror versions of each other about a plane separating the two components. These elements may be integrated into one monolithic, continuous component 14B1 14B2, such as seen in FIG. 5B, or may be separated into two components in direct or indirect contact or having a spacial gap therebetween 14C1 14C2, as seen in FIG. 5C. In embodiments where the optical element includes two subcomponents or two adjacent components, the curvatures of the surfaces of the two subcomponents or adjacent components facing the phone screen and a wearer's eyes may be identical, such that the curve may be mirrored along the axis that subdivides the two subcomponents or adjacent components. Herein the curvature of individual optical elements will be referred to as the curvature of the optical element. The curvature of the optical element may define a single radius along the optical element or may include one or more radii across the optical element.

Figure 6:
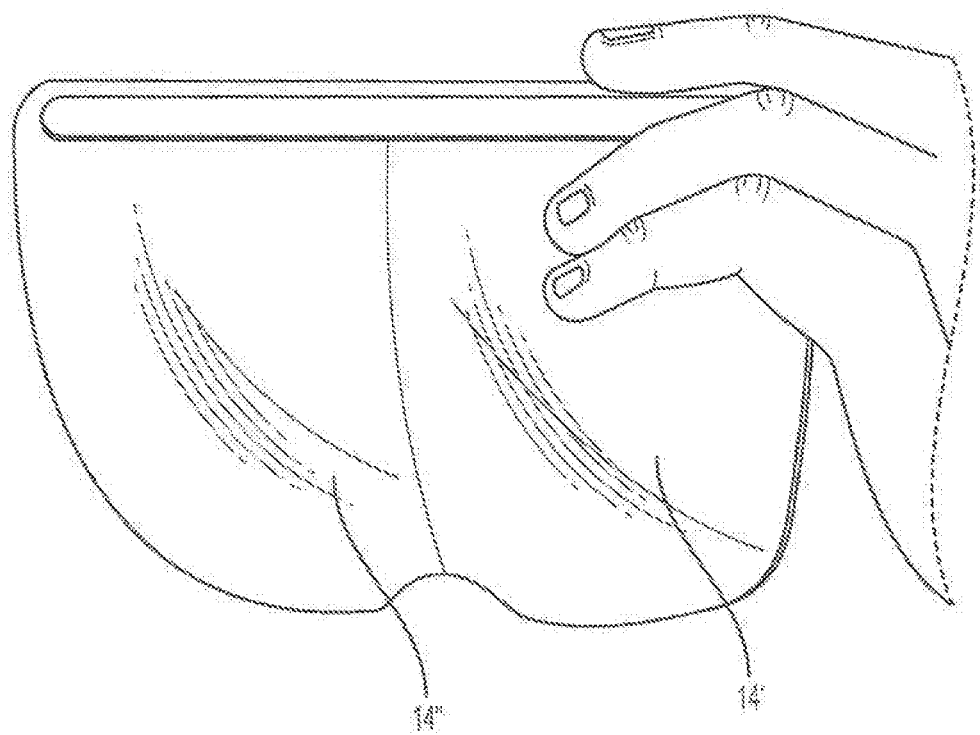
FIG. 6 illustrates an exemplary embodiment of an optical element prepared for a headset according to embodiments described herein.

FIG. 6 illustrates an exemplary embodiment of an optical element prepared for a headset according to embodiments described herein. As shown, the optical component 14 is divided into a first section 14' and a second section 14", where the first section and second section are mirror opposites of each other. The first section and second section may be in direct contact to define a single optical element. The optical element has a top side a bottom side and two lateral sides. The top side may be approximately the same length as the display/projector for creating the virtual image. For example, the top side may approximate the length of a mobile electronic device such as a smart phone. The bottom side may be approximately equal to or greater than the top side. The terminal edges of the optical component may define a curve such that from a perspective of the interior of the optical element one or more of the optical component edges are concave. In an exemplary embodiment, an outer, lateral side of the first section 14' and second section 14" may be curved. The lower, bottom side of the first section 14' and second section 14" may be curved. The lower, bottom side of each section may have a compound curve such that a majority of the bottom edge is concave when viewed from an interior of the optical element region. The compound curve may define a second curve where the first and second sections meet such that a convex continuous curve is defined across the transition between the first and second sections. The convex curve defines a region of reduced height compared to the rest of the optical element. The first section and second sections are mirror reflections of each other.

An exemplary embodiment of an optical element is a polycarbonate having an index of refraction of approximately 1.5-1.7, or approximately 1.59. The optical element may be spherically curved such that it has a radius of an approximately constant radius of curvature across the optical element. For example, the optical element may have a first radius of curvature (S1) on an inner surface (i.e. concave surface) of approximately 127 mm with a variation of 0.2 mm or less and a second radius of curvature (S2) on an outer surface (i.e. convex surface) of approximately 129 mm with a variation of 0.5 mm or less. The center of radius of the first and second surfaces should be approximately the same so that the optical element thickness is approximately constant. The exemplary optical element has a surface figure of S1 of less than 25 um P-V over the clear aperture, measured with a profilometer or interferometer in reflection mode with power, piston, and tilt removed, and surface figure of S1+S2 of less than 25 um P-V over the clear aperture measured with an interferometer in transmission mode with power, piston, and tilt removed. The surface roughness of the optical element may be defined by an inspection area of approximately 4.0 mm diameter anywhere within a clear aperture. The S1 surface is less than 25 nm root mean square (rms) measured with a profilometer or interferometer inflection mode with power, piston, and tilt removed and S1+S2 surface less than 63 root mean square (rms), measured with an interferometer in transmission mode with power, piston, and tilt removed. The exemplary optical element includes an average thickness of 1.5 to 2.2 mm. The exemplary optical element may be approximately 69.85 mm width, 82.55 mm height and 1.778 mm thick. The exemplary optical element may also include coatings. The coating on the concave, inner surface may include a reflective, dielectric coating, a reflection of approximately 30-35 having a 4% or under variation from 400 to 700 nm and 0-45 degrees angle of incidence (AOI) plus a hard coating. The convex, outer surface includes an anti-reflection coating of reflection (R) less than or equal to 3% from 400 to 700 nm and 0-45 degree angle of incidence (AOI) plus a hard coating. The exemplary embodiment of the optical element is made from a polycarbonate. The exemplary optical element has a first side and second side, where the first and second sides are mirror reflections. Deviations between the sides of the optical element may lead to different placement and scaling of the virtual object reflected off of the optical element that may lead to eye strain and fatigue. Deviations between the first side and second side from a nominal position with respect to the individual combiner centers of curvature include 80 micrometers in the horizontal position, parallel to the line between the user's eyes (i.e. x direction into the page of FIG. 4), 130 micrometers in the vertical direction (i.e. y direction of FIG. 4), and 80 micrometers in the horizontal direction outward from the face of the user (i.e. z direction of FIG. 4) and an angular deviation in the x and y directions of 0.04 degrees and 0.08 degrees in the angular z direction. The origin may be defined as the midpoint between the left and right eye pupil locations with the coordinate system defined with respect to FIG. 4. In this reference frame, the optical element may have an x position, sphere center to origin of approximately 29.61-33.61 mm; a y position, sphere center to original of 51-91-55.41 mm, a z position, sphere center to original of −42.48 to −27.78 mm, y position, original to display lower edge of 13.9 mm and z position, origin to display lower edge of minus 25.40 mm, and S1 tilt about the optical element pivot point x-axis of −2.0 to 0.7 degrees, S1 tilt about the optical element pivot point y-axis of −2.0 to 2.0 degrees, S2 tilt about z-adjusted optical element pivot point x-axis of −1.1 to 0.8 degrees, and S2 tilt about the z-adjusted optical element pivot point y-axis of −1.1 to 1.1 degrees. The z-adjusted pivot point is 2 mm farther from the pupil farther from the pupil along the z-axis. In an exemplary embodiment, the headset is configured to position the display with a lower edge midpoint position to original of −2.0 to 2.0 mm, a lower edge y position to origin 11.9-15.9 mm, a lower edge z position to origin of 24.4-27.40 mm, tilt about lower edge x-axis 37.22-40.02 degrees, and tilt about the lower edge y-axis of −2.0 to 2.0 mm. In an exemplary embodiment, approximations are based on limiting the RMS blur over the field for the nominal case of less than or equal to two pixels in reflection and/or to the eye's resolution in transmission.

Exemplary embodiments described herein may include an augmented reality headset that uses a display or projector and an optical element to superimpose virtual objects into the visual field of view of the user. Exemplary optical elements permit the user to see through the element and reflect the image from the display or projector.

In an exemplary embodiment, the frame 12 may permit removable or collapsible attachment of one or more components or elements. For example, the optical elements may be collapsible, such as by positioning on a hinge or other mechanism that the optical element may rotate or translate relative to the frame. The optical elements may also be removable from the frame. In this case, the optical element may slide into an aperture in the frame, may magnetically couple to the frame, or otherwise removably attach to the frame. In an exemplary embodiment, the reattachment is configured to position the optical element in a specific location relative to the frame. Therefore, the frame and/or optical element may include mated surface or features to lock or align the relative position in a predetermined orientation when the components are mated, such as magnets, detents, indentions, frictional elements, latches, hooks, belts, and combinations thereof.

Figure 7:
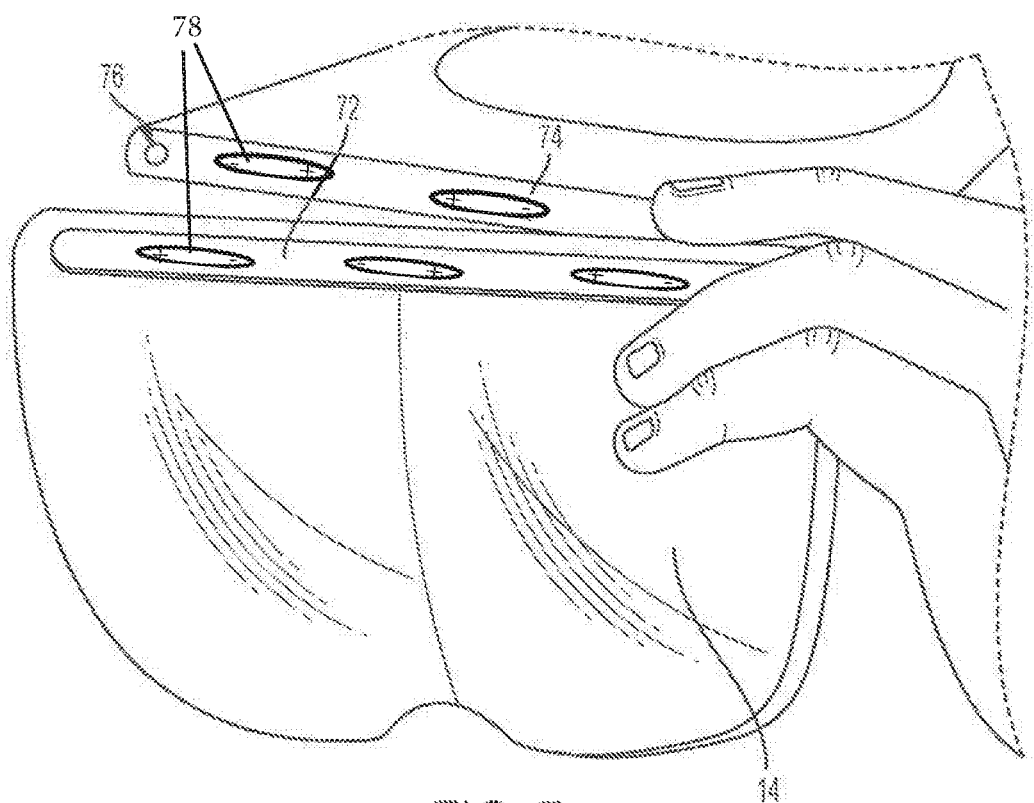
FIG. 7 illustrates the optical element of FIG. 6 positioned adjacent a corresponding attachment mechanism of the headset frame.

FIG. 6 illustrates an exemplary embodiment of an optical element having an attachment mechanism. FIG. 7 illustrates the optical element of FIG. 6 positioned adjacent a corresponding attachment mechanism of the headset frame. The attachment mechanism may include a first part 72 on the optical element 14 and a second part 74 on the frame. The first part and second part may removably couple. As shown, the first part 72 and second part 74 are magnetic. In an exemplary embodiment, the first part and second part may each include a plurality of magnetic elements 78. The magnetic elements 78 may alternate in polarity along a length of the respective component. The first part and second part may have magnetic elements of opposite polarity along their length, such that the corresponding magnetic elements 78 of each component matably attract. The opposing polarities within the same component may be used to align the optical element to the frame. In an exemplary embodiment, the optical element and the frame each have four magnetic elements. In an exemplary embodiment, the alignment mechanism of the optical element and the frame are on upper edges of facing surfaces of the respective components.

In an exemplary embodiment, the attachment mechanism may include an alignment mechanism. As described, the attachment mechanism itself may provide alignment, such as by alternating the polarity of the magnets within the attachment mechanism. The attachment mechanism may also or alternatively be in addition to the attachment mechanism. For example, an alignment mechanism 76 may be included on the frame and/or optical element. The alignment mechanism 76 may position the optical element in a defined position relative to the frame when fully attached. As shown, the alignment mechanism is a mated surface such that the surface of the frame mates in a predefined manner and position to the corresponding mated surface of the optical element. The mated surface may be through texture, indentations, protrusions, apertures, hooks, frictional elements, latches, belts, tapered surface, contoured surfaces, curved surfaces, and combinations thereof. As shown, the frame includes two projections on opposing ends of a front face of the frame attachment mechanism that mate with two indentations on opposing ends of the optical element attachment mechanism. In an exemplary embodiment, the magnetic configuration is designed to bring the optical element into approximately alignment with the frame and the mated surfaces are configured to more precisely align the optical element to the frame for final attachment and alignment.

Figure 8A:
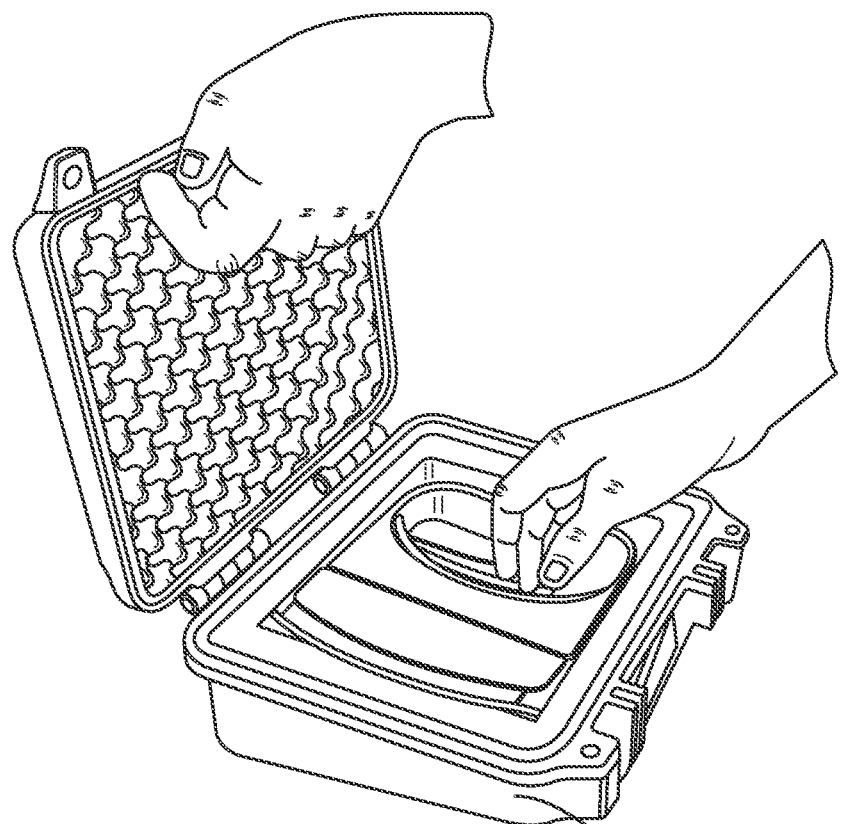
FIGS. 8A-8C illustrate an exemplary headset with optical element transitioning from a stored configuration to an in use configuration.
Figure 8B:
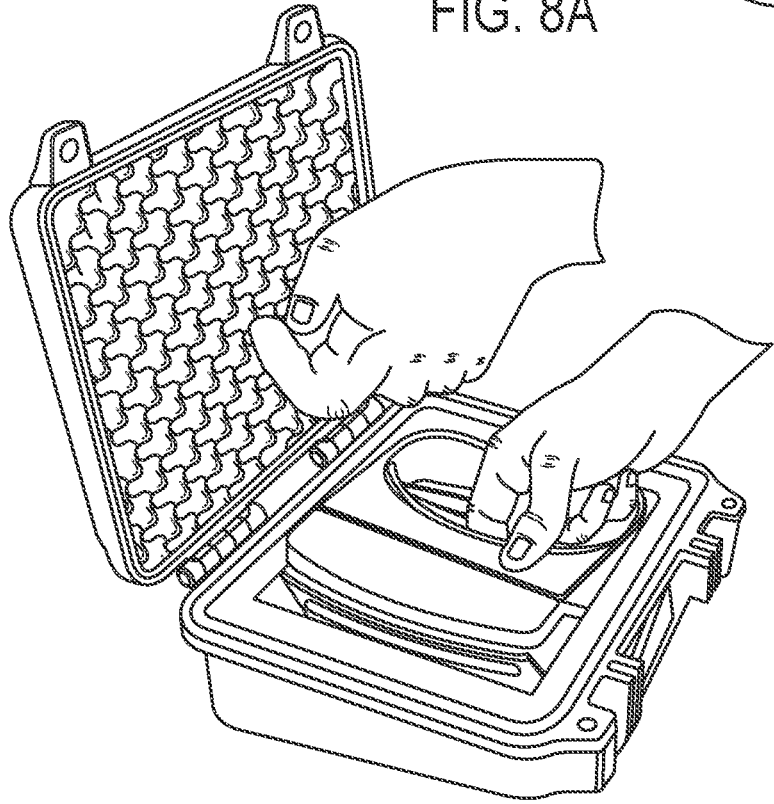
Figure 8C:
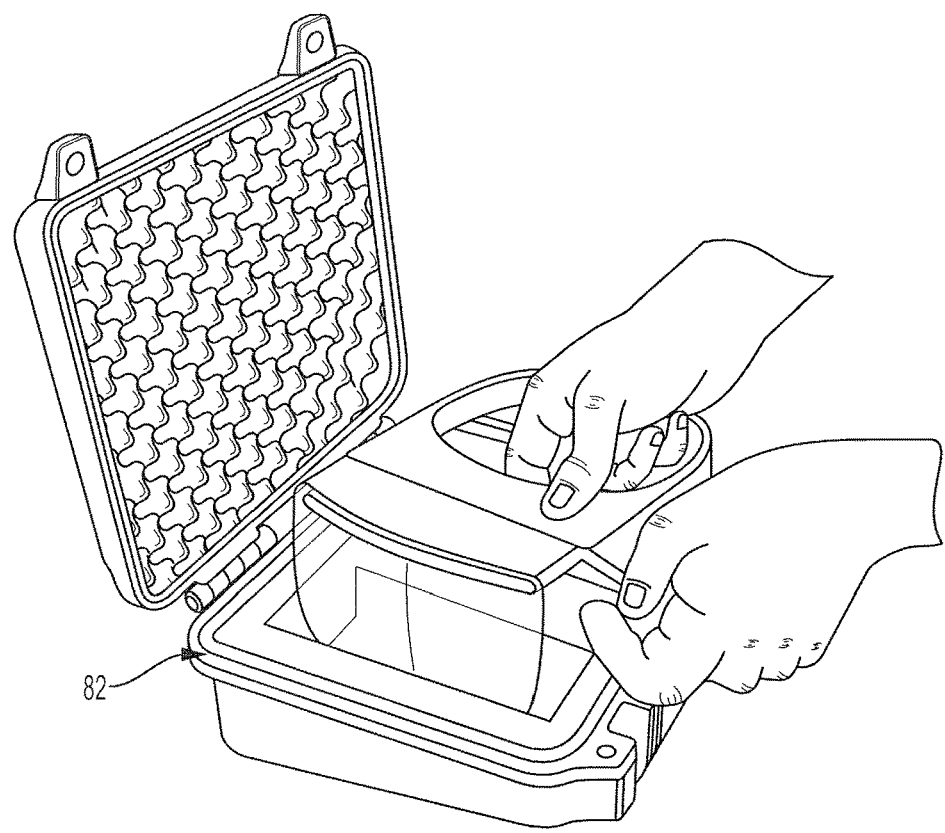

FIGS. 8A-8C illustrate an exemplary headset with optical element being removed from a stored configuration. In an exemplary embodiment, the attachment mechanism permits that optical element to be stored in a compact configuration relative to the frame. The compact configuration has a dimension that is less than a dimension of the headset in an in use configuration. For example, as shown, the height of the headset is reduced in a stored configuration as the optical element is rotated and collapsed relative to the frame.

In an exemplary embodiment, the headset system may include a storage container 81. The storage container may include indentations or positions configured to store one or more components of the headset system. As shown, the indentation may be configured to position the optical element proximate the frame such that removal of the frame automatically repositions the optical element relative to the frame. For example, the optical element may be in sufficient proximity that the attachment mechanism of the optical element to the frame engages when the frame is removed from the container. The attachment mechanism may be configured to automatically align the optical element relative to the frame from the stored position within the container to an in use position out of the container. For example, the stored configuration may position the optical element in sufficient proximity to the frame that the magnetic attraction of the attachment mechanisms position brings the lens to the frame as the frame is removed from the container.

In an exemplary embodiment, the headset includes a stored configuration and an in use configuration. The stored configuration may have a height dimension less than the height dimension of the in use configuration. The headset may transition from the stored configuration to the in use configuration by rotating the optical element relative to the frame. The headset may transition from the stored configuration to the in use configuration by separating a portion of the optical element from the frame. In an exemplary embodiment, the stored configuration may position the attachment mechanisms in sufficient proximity such that a magnetic attraction between the attachment mechanism will automatically engage the headset and transition the headset from the stored configuration to the in use configuration upon removal of the frame from the container.

In an exemplary embodiment, the frame 12 of the headset includes a compartment to secure a mobile device to the headset. Any attachment or support may be use where the mobile device is positioned with the screen directed toward the optical element, where the mobile device is positioned outside of the physical field of view of the user, thus defining a free space between the user's eye and the optical element.

Figure 9:
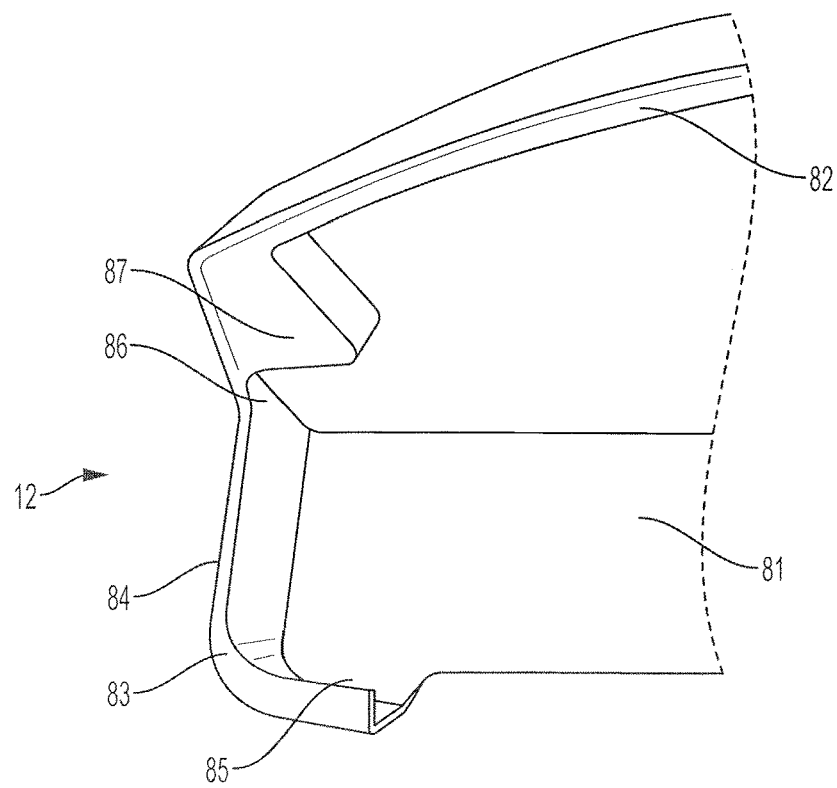
FIG. 9 illustrates an exemplary embodiment of a compartment without an inserted mobile device.

Exemplary embodiments of the compartment include a slot for statically positioning the mobile device in the headset relative to the optical element without obstructing the forward facing camera. FIG. 9 illustrates an exemplary embodiment of the compartment from a first direction without an inserted mobile device and FIG. 10 illustrates an exemplary embodiment of the compartment from a second direction with an inserted mobile device and shading and/or retention element.

Figure 10:
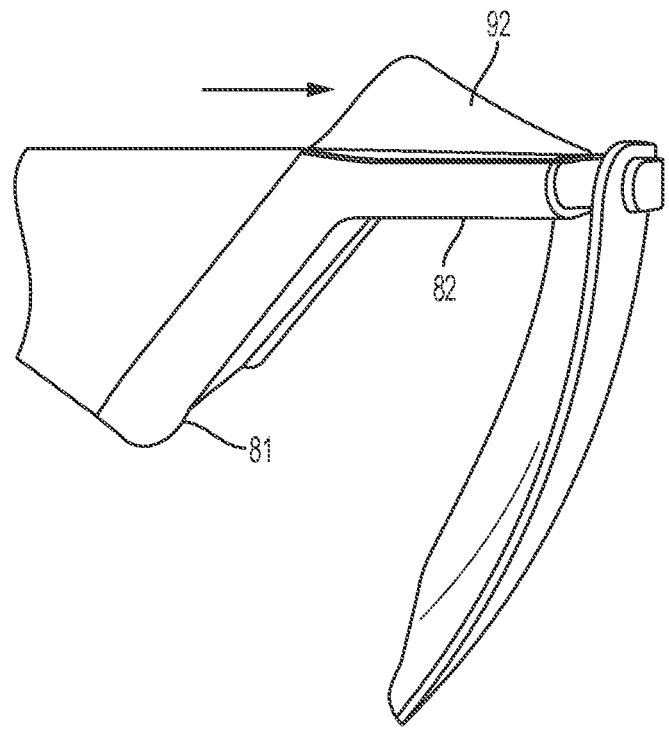
FIG. 10 illustrates an exemplary embodiment of the compartment an inserted mobile device and shading and/or retention element.

As seen in FIG. 10, the frame may include a first portion 81 configured to support and position an inserted mobile device and a second portion 82 configured to support the optical element relative to the inserted mobile device. The first portion may be angled relative to the second portion. As shown previously with respect to FIG. 4 the frame may be configured to angle the mobile device and orient and position the mobile device in a predefined configuration relative to the optical element. As illustrated with respect to FIG. 4 a lower edge D1 of the mobile device screen and an upper edge D2 of a mobile device screen define a screen orientation. The screen orientation angles the mobile device screen relative to a vertical orientation. The angle, θ, is approximately 35-45 degrees, or preferably approximately 39-40 degrees. In an exemplary embodiment, the frame is configured to position a lower edge of the mobile device D1 in front of and above the expected eye location by approximately 20-30 mm forward and 10 to 20 mm above, or approximately 23-27 mm in front and 10-15 mm above an eye location. In an exemplary embodiment, the pivot location P of the optical element is positioned in front of the mobile device screen. Relative to the user eye location, the pivot or attachment location of the optical element to the frame is approximately 90-100 mm in front of and 45-55 mm above the user eye location, or approximately 94-95 mm in front and 47-50 mm above the eye location, E.

In an exemplary embodiment, the first portion 81 defines a compartment for positioning and retaining the mobile device. The compartment may include one or more side portions, a back portion, and a front portion to retain the mobile device and limit motion of the mobile device in one or more directions relative to the frame. As shown, the front portions may be extensions from the side portions, such that a lip or flange is defined to extend from the back portion. The compartment may be defined by opposing lateral sides 84 that project perpendicular to the back surface of the compartment. The compartment may include a bottom side 83. The bottom side may be configured to support a lower edge of a mobile device once seated within the compartment. The bottom side 83 may include a flanged edge 85 that is positioned in front of an inserted mobile. The flanged edge may extend from an end of the bottom side in a direction parallel to a back surface of the compartment. The bottom side 83 may include a gap such that a portion of the back surface is not bounded by a bottom side. As shown, the bottom side may be positioned at opposing ends of the back surface. The back surface may include an indentation along a portion extensive with the gap of the bottom side. The compartment may be configured such that when the mobile device is fully seated or positioned in the compartment, a predetermined position and orientation of the mobile device screen, camera, optical element, user's field of view, and combinations thereof are known and defined.

The compartment may include detents, indentions, frictional elements, latches, hooks, belts, and other combinations thereof to securely fasten the phone to the compartment and/or confirm that the mobile device is fully and properly seated in the compartment. In an exemplary embodiment, the bottom side 83 defines an inner surface configured to support a lower edge of an inserted mobile device and predefine a location of the bottom edge of the device screen relative to the headset. In an exemplary embodiment, the flange 85 includes an inner surface configured to support a front face of an inserted mobile device and predefine a location of the screen plane of the mobile device relative to the headset. The second portion 82 of the frame may include additional location features such as projection 87 that is similarly configured to contact a front surface of a mobile device and predefine a location of the screen plane of the mobile device relative to the headset.

As shown in FIG. 9, the frame may include an aperture 86 configured to accept a mobile device and permit a mobile device to extend through the second portion 82 of the frame. As shown in FIG. 10, once a mobile device is fully seated within the frame, the mobile device extends above a top surface of the frame.

In an exemplary embodiment, the frame may include a retention mechanism 92 to secure the mobile device within the frame. As shown, the retention mechanism is an elastic material configured to apply pressure on the mobile device toward the inner surface of the bottom side and toward the inner surface of the flange. Therefore, the elastic material is configured to retain the mobile device toward the positional surfaces of the frame. The positional surfaces of the frame define the relative positions of the frame, mobile device, and optical element to improve the virtual experience by more accurately and intentionally position virtual elements within a field of view of the user. The retention mechanism may also be other structures, such as straps, ratchets, ties, clasps, pull strings, etc. The retention mechanism may be coupled to the frame such as by adhesion, friction fit, snaps, clasps, hook and loop fastener, belt loop, projection through an aperture, etc.

In an exemplary embodiment, the elastic material is a sheet that is positioned across the top of the frame. The elastic material may act as a shade and reduce overhead light from unintentionally contacting and reflecting off the optical elements. The elastic material may therefore be opaque. The elastic material may extend across a portion of the second portion 82 of the frame. The elastic material may also be a band, loop, or other configuration.

In an exemplary embodiment, when the headset is not in use, the elastic material defines a plane across the top of the headset. When the headset is in use, the inserted mobile device deforms the elastic material. To position the mobile device within the headset, the user may insert the mobile device through the aperture 86 between the first portion 81 and section portion 82 of the frame. The user may use the indentation along the bottom side to position the mobile device above and over the flange. The mobile device may then be positioned between the flange and the back surface. When the mobile device is released, the elastic material may be configured to push the mobile device into the space between the flange and the back surface to contact the bottom edge of the mobile device with an inner surface of the bottom side of the frame compartment.

The sides, and flanged surfaces may be contoured to support portions of the perimeter of the mobile device and not obstruct the camera, light, microphone, speaker, touchscreen, and/or any combination of input/output devices of the mobile device. The compartment may include apertures, cut outs, recesses, or other configurations to provide access to other features of the mobile device, such as buttons, ports, etc. The compartment may also be configured to not obstruct the front facing camera of the mobile device so that the mobile device's field of view from the camera is in a space in front of the user.

Figure 12A:
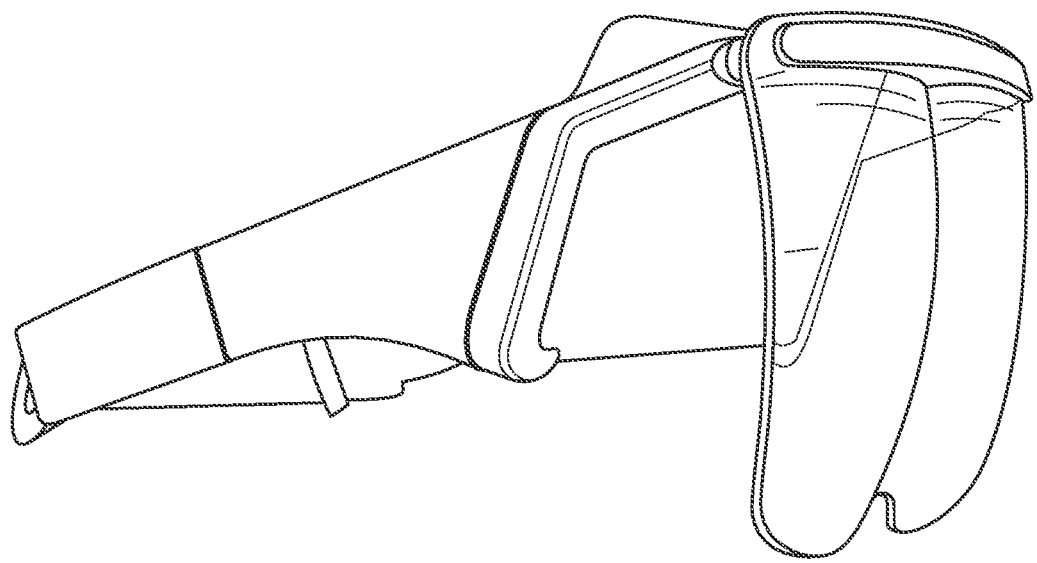
FIGS. 12A and 12B illustrate different perspective views of an exemplary embodiment of the headset including a head restraint for securing the headset to a user's head.
Figure 12B:
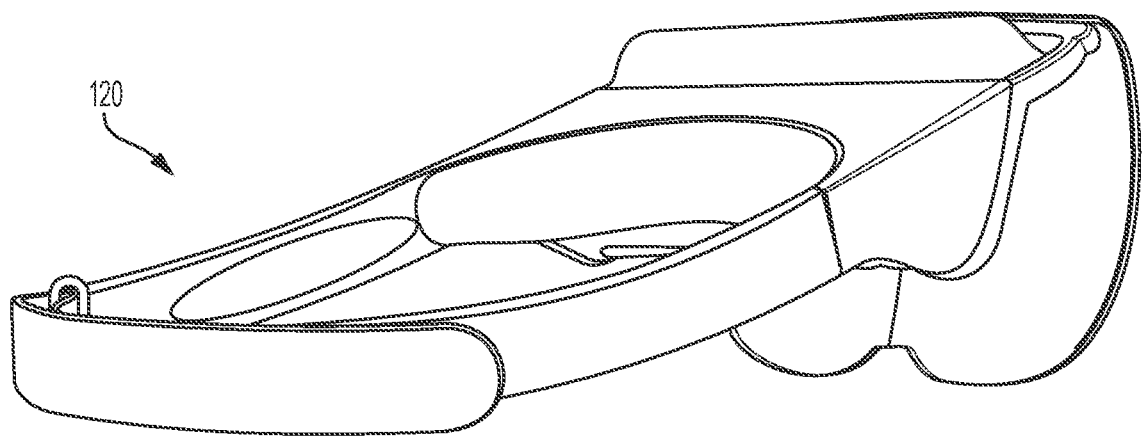
Figure 13:
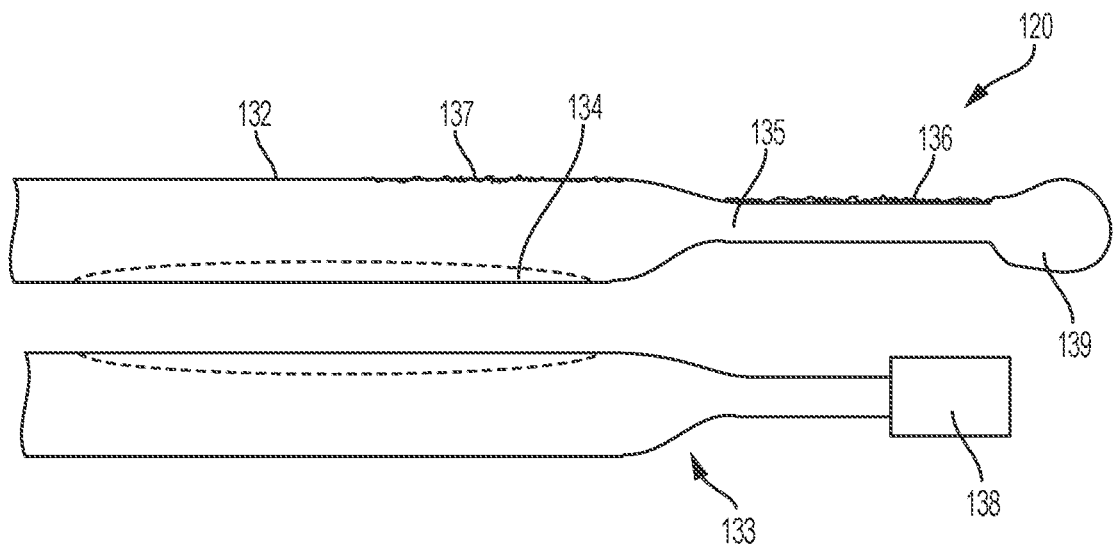
FIG. 13 illustrates an exemplary component set including two head straps as viewed from above.

In an exemplary embodiment, the headset is secured to a user's head through one or more head restraints. The head restraints may include one or more straps, surface, cap, covering, other object, or combinations thereof. FIGS. 12A-12B illustrate perspective views of an exemplary embodiment of the headset including a head restraint 120 for securing the headset to a user's head. FIG. 13 illustrates an exemplary component set including two head straps as viewed from above and FIG. 14 illustrates the exemplary head straps of FIG. 13 as viewed from a side.

Figure 14:
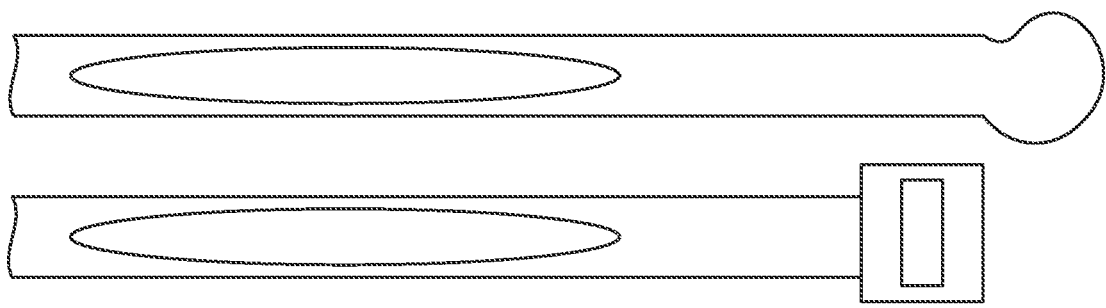
FIG. 14 illustrates the exemplary head straps of FIG. 13 as viewed from a side.

As seen in FIGS. 13-14, an exemplary head restraint may include two or more straps. The two or more straps may be configured to mate and adjustably couple the headset to a user's head. A first strap 132 and second strap 133 may couple to adjust a total length of the head restraint. In an exemplary embodiment, the first and second straps may include hook and loop fastener (such as Velcro®), hooks, loops, buckles, snaps, and combinations thereof to couple the first strap to the second strap. As shown, the first strap 132 may include hook and loop fasteners 136, 137 that removably attached and the second strap 133 may include a loop for positioning the first strap through and doubling the first strap back on itself to directly contact the hook and loop fasteners. In an exemplary embodiment, the first strap may include a tapered section 135 between a first end and a second end defining two different strap thicknesses. The reduced thickness section of the strap may facilitate flexibility and permit the strap to more easily bend and directly contact the hood and loop fasteners for a strong attachment. In an exemplary embodiment, the first strap may also include a tab or other frictional piece 139 that facilitates gripping and pulling the strap through the buckle 138 and securely contact and attached the hood and loop fasteners.

The headset puts a substantial forward weight on the headset as much of the weight of the device and supported mobile device extends forward of the user's face. The head restraint preferably securely supports the entire system. In an exemplary embodiment, the inner surface of the straps 132, 133 include indentations 134. The indentations are generally ovoid and define a concave surface on the strap inner surface. The indentations may provide added stability to the head restraint and reduce the probability that the straps will bend or buckle in an undesirable direction. In an exemplary embodiment, the indentations extend approximately 4 to 7 inches along the strap length. In an exemplary embodiment, the indentation is configured to extend from adjacent the attachment of the strap to the headset frame to a position behind a user's ear.

In an exemplary embodiment, the head restraint is removably coupled to the headset frame. The straps may insert into mated surfaces on opposing sides of the frame. In an exemplary embodiment, the mated surfaces are keyed such that the straps fit within the mated surfaces in a predefined orientation. For example, the straps may have a predefined upward orientation (indicated by a logo or other writing on the strap itself). The strap may matably couple to the headset such that a first strap only fits into a first mated surface and a second strap fits only into a second mated surface. The first strap may be configured to fit into the first mated surface in a predefined orientation as defined by the keyed mated surface. For example, the frame may include an aperture or indentation in which projections from the straps are inserted. The indentation of the frame may include curved or shaped edges that mate with curved or shaped edges of the strap projections. The mated surfaces may permit the attachment of the straps in a single orientation.

In an exemplary embodiment, the headset may include a forehead cushion coupled to an inner surface of the frame. The forehead cushion may provide a comfortable contact area for the headset against the user's head. In an exemplary embodiment, the forehead cushion may removably couple to the frame, such as by hood and loop fastener, adhesive, frictional engagement, snaps, buttons, hooks, loops, and combinations thereof.

In an exemplary embodiment, the head restraint may include a third strap positioned between the frame and/or forehead cushion and the first or second straps. For example, a third strap may include a loops end for encircling a portion of the first or second loop. Other attachment mechanisms may also be used, such as snaps, hook and loop fasteners, buttons, frictional engagement, loops, hoods, combinations thereof. The third strap may then couple to the forehead cushion such as through similar attachment means. For example, the third strap may loop around the forehead cushion, may button or snap to a portion of the forehead cushion or otherwise attach to the forehead cushion to create an over the head support of the head restraint.

In an exemplary embodiment, other features of the headset are modular. For example, the optical element removably attaches to the frame; the mobile device compartment may removably attach to the frame; the retention mechanism may removably attach to the frame; the straps may removably attach to the frame; the cushion may removably attach to the frame; and any combination thereof. The removably attachment between components may permit the system to accept or accommodate interchangeably components. The interchangeable components may be to customize the headset to a specific user, to replace parts for easy repair, for cleaning and maintenance, or for other reasons. In an exemplary embodiment, the system may support interchangeable optical elements such as for prescription and non-prescription or clear or tinted use. The system may support interchangeable head restrains for added comfort for more robust support.

FIG. 15 illustrates an exemplary embodiment of a modular system including an optical element 14, frame 12, and mounting system 16. As shown, the optical element and head mounting system can removably couple to the frame. As shown, the head mounting system may include separate straps that may insert into apertures of the frame. The inserts of the head mounting system may include a locking mechanism to latch and secure the straps when fully positioned relative to the frame. The locking mechanism may be released to remove the straps from the frame. As shown, the release may be through a button or tab that is depressed to decouple the lock from a mated surface on the frame. When in a locked position, the button or tab can contact a surface of the frame and prevent the removal of the insert from the frame. The optical element may removably couple to the frame such as through magnets or other attachment mechanism.

Exemplary embodiments are configured to use the camera of the mobile device for tracking. Virtual objects can be displayed to a user in a static display configuration. Virtual objects can also be or alternatively be integrated into the virtual experience or dynamically move relative to objects perceived in the field of view. In this case, the camera may receive images within the environment that may be used to track, locate, or orient the virtual objects relative to a physical field of view of the user.

Figure 11:
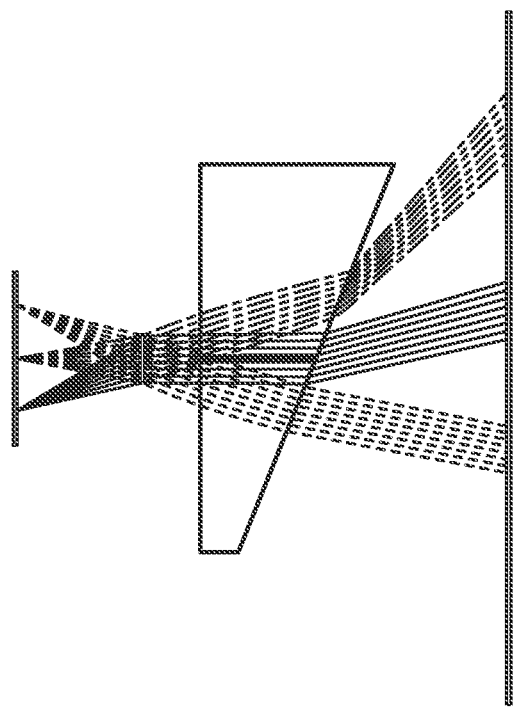
FIG. 11 illustrates a ray trace/light path for an optical component for expanding and/or redirecting the field of view observed by a camera of an inserted mobile device.

FIG. 11 illustrates a ray trace/light path for an optical component for expanding and/or redirecting the field of view observed by camera of the smart phone.

In an exemplary embodiment, an optical component may be built into the mobile device compartment such that it covers the front-facing camera of an inserted mobile device inserted into the compartment. The optical component may be configured to modify the image entering the front-facing camera to improve the tracking area. One example of this optical component may be a prism to modify the direction of the field of view of the optical component. For example, the optical component may deflect the incoming image by a set number of degrees up or down. A prism with a positive deflection may result in an image entering the front-facing camera that more closely aligns with the image observed by a user of the system, such as illustrated by FIG. 11. In an exemplary embodiment, this optical component may be a wide angle lens to enlarge the field of view of the camera.

The augmented reality system described herein may include a headset, a smartphone that is inserted into the headset, and software in the form of non-transitory machine readable medium saved in memory on the smartphone or accessible remotely that enables the headset to operate as described herein when executed by a processor of the smartphone. Although some embodiments of this invention may also include electrical components in the headset to enable additional functionality, exemplary embodiments include completely passive (uses no electronic, sensing, or computer systems) within the headset or external to the smartphone.

In an exemplary embodiment, a user may operate the augmented reality system by first opening an application containing the software to perform the functions described herein on their smartphone. The application may be downloaded or otherwise stored on the smartphone and opened by executing the code by a processor of the smartphone. The smartphone may also display images received from remote sources, such as on a browser or other user interface. The user would then insert the smartphone into the phone compartment of the headset such that its screen is facing the optical element and its front-facing camera is properly situated and unobstructured by the headset. Next, the user would place the headset on their head with the cushioning touching their forehead and tighten a strap so that the headset is secure. The user can now look through the optical element and see an undistorted and un-modified view of the world. In an exemplary embodiment, the optical element is configured to minimally interfere with the physical field of view of the user such that a user may perceive the physical world through the optical element. However, the user's field of view is modified by the superimposed virtual images reflected on the optical element.

In an exemplary embodiment, the software is configured to retrieve images from the forward facing camera. The received images may be adjacent, proximate to or overlap a physical field of view of the user. The software may be configured to use the received images to determine placement of virtual objects, determine which virtual objects to use, determine a size, location, or orientation of the virtual objects, recognize objects within a field of view of a user, determine movement of the headset, tracking of objects and corresponding position placement of virtual objects, and combinations thereof.

Exemplary embodiments may therefore include a smartphone having a front display screen and a front facing camera. The smartphone may include a processor for executing software and memory for storing software in a non-transitory, machine readable medium. Exemplary embodiments include software that when executed by the processor performs any combination of features described herein. Exemplary embodiments are described in terms of smartphones for the display and processing power of the exemplary embodiments. However, any mobile electronic device may be used. For example, dedicated electronic devices, tablets, phablets, gaming consoles, miniature televisions, smart displays, or other electronic displays may be used. Exemplary embodiments also encompass displays having remote processing power such that the execution of the methods described herein may be performed at the electronic device, remote from the electronic device and communicated to the electronic device, or combinations thereof. Preferably, the electronic device includes a front facing camera for receiving images to perform functions described herein.

Exemplary aspects of the software supporting the augment reality system may include a computer vision component, relational positioning between the position determined by the computer vision component and the software rendering cameras, stereoscopic rendering in stereoscopic embodiments, counter distortion shaders, and combinations thereof.

Exemplary embodiments of the computer vision component may process a real-time video stream from the front-facing camera to determine the headset's position in the physical world. The computer vision component may allow for "six degree of freedom" positional tracking. In one embodiment, the computer vision component tracks pre-programmed markers that may include two-dimensional images or three-dimensional objects. In this embodiment, the computer vision component may be able to identify a single marker individually, multiple markers independently, or multiple markers simultaneously. In one embodiment, the computer vision component tracks environmental features without global mapping. In one embodiment, the computer vision component uses Simultaneous Locating and Mapping (SLAM) techniques to build and reference a closed-loop global map from environmental features. In one embodiment, the computer vision component is implemented by plugging-in a pre-existing computer vision, augmented reality tracking, or SLAM library. In one embodiment, the front-facing camera feed is pre-undistorted before being fed into the computer vision component in order to improve the quality or mapping of the tracking.

In an exemplary embodiment, the computer vision component may produce an x, y, z, pitch, yaw, roll coordinate in a coordinate system pre-defined by the implementation. In an exemplary embodiment, the computer vision component may be configured such that references are from the origin point and the component outputs a displacement vector of any identified markers from the origin point.

Implementations of embodiments described herein may have a pre-calculated positional relationship between the front-facing camera and the virtual camera or cameras that produce output such that virtual objects appear in the correct position when displayed on the smartphone screen and combined through the optical element with the physical world. The method for calculating this positional relationship may depend on the design of the optical element. In an embodiment producing a stereoscopic image, the pre-calculated positional relationship may provide positions for two software cameras to produce separate imagery for left and right eyes.

In an exemplary embodiment, the software methods are implemented in a game engine. In this embodiment, these methods may be distributed as part of a software development kit (SDK) to allow for developers to create apps integrating these methods without having to implement these methods themselves.

Exemplary embodiments may also include any combination of features as described herein. Therefore, any combination of described features, components, or elements may be used and still fall within the scope of the instant description. For example, features may include the computing for the augmented reality experience is conducted by a smartphone inserted into the headset; the front-facing camera of an inserted smartphone has an unobstructed view through the optical element; the tracking is accomplished using information from the smartphone's front-facing camera; an output is displayed on the smartphone's screen; the optical element acts as a combiner that reflects the smartphone's screen to overlay imagery in the user's physical field of vision; the headset having only a single optical element in which light from the screen encounters between the screen and the user's eye; the headset not having any additional optical components for creating, generating, or overlaying the digital image in a user's field of view besides the optical element; the smartphone and optical element are in a fixed position during operation; the headset or system including inserts for fixing the position of an inserted mobile device during operation; the headset including dynamically adjustable mechanism for accommodating inserted mobile devices of various size; the headset including an elastic cover to shield the screen and retain the mobile device relative to the headset; the headset including retaining features to position the inserted mobile device; the headset no including computing power besides the phone; the optical element is removable; the optical element can fold for storage or transportation relative to the compartment; the optical element consists of two subcomponents to display stereoscopic imagery; the optical element including a coating on a first surface to reflect an image from the mobile device; the optical element including an anti-reflective coating on another surface to reduce reflection of an image from the mobile device; the optical element including a spherical curvature; the optical element having a uniform thickness; the optical element contains magnets and the compartment or a frame contains mating magnets that allow the optical element to attach and detach from the frame of the headset such that it is always in the correct positioning; integrated or removable straps or band secure the headset to a user's face; the compartment having a face cushion for comfort during use; the compartment having an integrated optical component covering the front-facing camera of the smartphone; the integrated optical component covering the front-facing camera of the smartphone modifies the image entering the front-facing camera to improve tracking area; the optical component is a prism; the optical component is a wide-angle lens; the mounting system including modular straps and support frames; the mounting system straps including surface features to increase structural support; the mounting system support features including an indentation on a broad side of the strap toward a user's head; The mounting system straps including tapered thickness; the mounting system including keyed mating surfaces to define an orientation or a mated pair; and any combination thereof or otherwise described herein.

Although embodiments of this invention have been fully described with reference to the accompanying drawings, it is to be noted that various changes and modifications will become apparent to those skilled in the art. Such changes and modifications are to be understood as being included within the scope of the present disclosure as defined by the appended claims. Specifically, exemplary components are described herein. Any combination of these components may be used in any combination. For example, any component, feature, step or part may be integrated, separated, sub-divided, removed, duplicated, added, or used in any combination with any other component, feature, step or part or itself and remain within the scope of the present disclosure. Embodiments are exemplary only, and provide an illustrative combination of features, but are not limited thereto.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be used for realising the invention in diverse forms thereof.

The invention claimed is:

1. A headset system, comprising: a frame configured to support a display and retain the display out of a normal field of view of a wearer; an optical element coupled to the frame and positioned relative to the frame in an in use position to define a free space between the wearer's eye and the optical element to reflect an image directly from the display positioned in the frame directly to the wearer's eye; and an attachment mechanism between the frame and the optical element for removable attachment of the optical element to the frame, the attachment mechanism comprising a first plurality of magnets in a first attachment mechanism of the frame and a second plurality of magnets in a second attachment mechanism of the optical element wherein adjacent ones of the first plurality of magnets alternate orientations such that the first plurality of magnets alternate polarity in a forward facing direction.

2. The headset of claim 1, wherein the second plurality of magnets are positioned and oriented such that each of the second plurality of magnets aligns and mates with one of the first plurality of magnets, and the second plurality of magnets have an opposing polarity directed toward a corresponding one of the first plurality of magnets.

3. The headset of claim 1, further comprising an alignment mechanism to position the optical element relative to the frame when engaged.

4. The headset of claim 3, wherein the alignment mechanism comprises mated surfaces, such that a first surface on the frame is the mated match to a second surface on the optical element.

5. The headset of claim 4, wherein the mated surfaces comprises an indent and detent.

6. The headset of claim 1, further comprising an elastic cover on top of the frame.

7. The headset of claim 6, wherein the compartment of the frame comprises a back surface, a first lateral side surface extending outward from the back surface, a second lateral side surface extending outward from the back surface on an opposite end of the back surface form the first lateral side, and a bottom side extending from the back surface.

8. The headset of claim 7, wherein the bottom side comprises a flanged edge and the back surface comprises an indentation along a same edge as the bottom side.

9. The headset of claim 8, wherein the frame comprises an extension section extending outwardly from a top region on the compartment, the extension section defining a relative position between a compartment and the optical element, the extension section having an aperture to accommodate an inserted mobile device having the display and the elastic cover extending over the aperture of the extension section.

10. The headset of claim 1, further comprising a head restraint system configured to couple the frame to a user's head.

11. The headset of claim 10, wherein the head restraint system comprises a pair of straps extending from the frame, at least one of the pair of straps defining a taper such that a first end of the at least one of the pair of straps is thinner than a second end of at least one of the pair of straps.

12. The headset of claim 11, wherein each of the pair of straps includes an indentation on an inner surface of each of the pair of straps, the indentation defining an ovoid, concave, curved surface.

13. The headset of claim 1, wherein the optical element comprises a first section and a second section, the first section and second section being mirrored opposites.

14. The headset of claim 13, wherein an axis of reflection defining the mirrored opposites is about an axis extending between the first section and second section.

15. The headset of claim 14, wherein the first section and second section define curved surfaces having a first radius of curvature in a first cross section and a second radius of curvature is a second cross section perpendicular to the first cross section.

16. The headset of claim 15, wherein a first concave surface of the first section and a second concave surface of the second section include a reflective coating.

17. The headset of claim 16, wherein the optical element comprising an anti-reflective coating, a hydrophobic coating, and an abrasion resistant coating.

18. The headset of claim 9, wherein the frame is configured to position a front display screen of the mobile device at an angle, away from the frame and toward the optical element, the frame configured to not obstruct light coming into a forward facing camera of the mobile device and providing access to other ports and control features of the mobile device.

19. A headset system, comprising:
a frame having a compartment configured to support a mobile device and retain the mobile device out of a field of view of a wearer;
an optical element coupled to the frame and positioned relative to the frame in an in use position to define a free space between the wearer's eye and the optical element to reflect an image directly from a mobile device display positioned in the frame directly to the wearer's eye;
a first attachment mechanism comprising a first plurality of magnets on the frame, wherein adjacent ones of the first plurality of magnets alternate orientation such that a polarity of adjacent ones of the plurality of magnets alternate along a length of the first attachment mechanism; and
a second attachment mechanism comprising a second plurality of magnets on the optical element, the second attachment mechanism configured to attract the first attachment mechanism.

* * * * *